Figure 4:
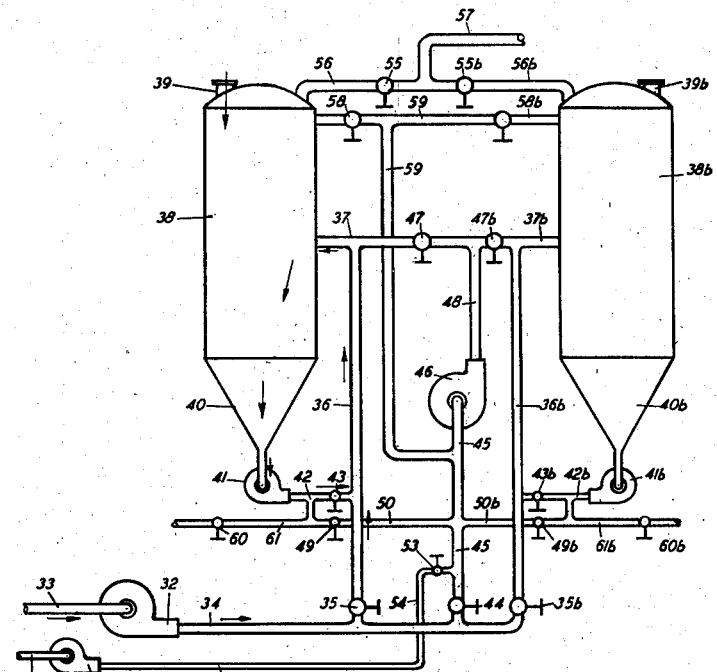

Nov. 6, 1934.  H. H. CANNON  1,979,448
METHOD OF SWEETENING PETROLEUM PRODUCTS
Filed July 21, 1930   3 Sheets-Sheet 1

HUGH HARLEY CANNON
INVENTOR
ATTORNEY

Nov. 6, 1934.     H. H. CANNON     1,979,448
METHOD OF SWEETENING PETROLEUM PRODUCTS
Filed July 21, 1930     3 Sheets-Sheet 3

HUGH HARLEY CANNON
INVENTOR
ATTORNEY

Patented Nov. 6, 1934

1,979,448

UNITED STATES PATENT OFFICE 1,979,448

METHOD OF SWEETENING PETROLEUM PRODUCTS

Hugh Harley Cannon, Los Angeles, Calif., assignor to Cannon-Prutzman Treating Processes, Ltd., Los Angeles, Calif., a corporation of California Application July 21, 1930, Serial No. 469,444

6 Claims. (Cl. 196—33)

My invention pertains to the art of converting the mercaptans or alkyl hydrosulfids, which are a common and an objectionable constituent of gasolines, cracked naphthas and kerosenes, into the corresponding alkyl disulfids, which have unobjectionable characteristics and which may be removed by fractional distillation if desired. This operation is usually and is hereinafter referred to as "sweetening", the product of the operation is referred to as "sweet oil", and the raw material containing mercaptans is referred to as "sour oil".

An object of my invention is to apply to the sour oil a reagent consisting substantially of calcium hydroxid and lead monoxid, or any reagent which may be maintained in the form of an incoherent powder, in such manner as to continuously remove from the reagent grains a coating or skin of reaction products and thus to maintain an intimate contact between the reagent and the reactive bodies in the oil and to effect a complete utilization of the reagent.

A further object of my invention is to so manipulate any sweetening reagent within a closed system through which the oil passes in a flow stream as to retain within the system substantially all of the lead or other metal which enters into direct combination with the mercaptans contained in the sour oil, thus preventing the loss of this expensive ingredient and enabling it to be reused an indefinite number of times without recourse to a secondary or extraneous recovery operation.

A further object of my invention is to maintain the oil undergoing treatment in a completely closed system, thus avoiding any loss by evaporation of the volatile oils to which the sweetening step is customarily applied.

A further object of my invention is to provide apparatus suitable for the performance of the above method steps and operations.

In the usual and best known manner of sweetening petroleum products the sour oil is intimately contacted with an aqueous solution of lead monoxid in sodium hydroxid, this mixture in molecular proportions being assumed to be a compound, "sodium plumbite" (PbO plus 2 NaOH—$Na_2PbO_2$). In this treatment the lead unites with the mercaptan, displacing the hydrogen of the hydrosulfid and forming a so-called lead mercaptid, having the general formula $Pb(RS)_2$, in which R is any alkyl radical.

The mixture of lead mercaptids thus formed is a heavy oil which, from an operative standpoint, is soluble in the oil in which it is formed. Strictly speaking it may not be soluble at all and it certainly is not completely soluble as, after long standing, at least a portion of the mercaptid will subside to form a defined layer. As formed, however, it is so finely divided and dispersed in the oil that it settles very slowly and incompletely and in continuous operations, in which the oil is treated in a flow stream, it may be assumed to remain in and be carried forward with the oil.

The mercaptid is therefore removed from the oil by treating it with elementary sulfur, either as a powder or in the form of a solution in a portion of the oil to be treated, the sulfur precipitating the lead as a sulfid (PbS) while two monosulfid radicals (RS) unite to form the corresponding disulfid $(RS)_2$. The disulfids are oil soluble and remain in the treated oil, but as they are free from the foul odor and the reactivity with metals which characterize the mercaptans they are a relatively innocuous constituent of the finished product and further, as their boiling point is much higher than that of the corresponding mercaptans, they may be left behind as the residue of a final distillation. The lead sulfid, being oil insoluble and of high specific gravity, subsides from the oil with some readiness and may be withdrawn as a sludge from which the lead may be recovered for reuse by a suitable secondary operation.

The process above described is ordinarily conducted as a batch process in which the oil is treated with sodium plumbite solution, the partly or entirely exhausted solution withdrawn, the mercaptid-containing oil treated with sulfur and the lead sulfid separated from the sweetened oil. In this process the lead content of the reagent can be used but once without an extraneous regeneration. That is to say, the lead after combining with two mols of mercaptan is precipitated as a nonreactive lead sulfid, is withdrawn in that form and must be oxidized and again brought into solution in sodium hydroxid before it can again be brought into combination with a further quantity of mercaptan.

In a modification of this process described in existing patents, a stream of sour oil previously dosed with a predetermined proportion of sulfur is continuously contacted with a body of sodium plumbite solution. In this process the two reactions above described take place simultaneously, the lead of the plumbite forming lead mercaptids which are immediately split by the free sulfur, the lead being precipitated. The oil is thus sweetened in a single operation, which is continuous so long as any lead in the form of plumbite remains in the solution and ceases when the lead is more or less completely converted into the sulfid.

In the presence of a material excess of sodium hydroxid there appears to be a slow reconversion of lead sulfid into sodium plumbite, the sulfur from the lead sulfid combining with sodium hydroxid to form sodium sulfid. This reconversion is ordinarily too slow to be of any material value in increasing the amount of work done by the lead, but it may be utilized in removing the lead from the spent reagent in the manner hereinafter set forth and which is a part of my present invention.

In a co-pending application filed by H. H. Cannon and W. W. Gary on January 21, 1929, under Serial No. 334,003, and in a co-pending application filed by H. H. Cannon on July 8, 1929, under Serial No. 376,516, there is described a method of sweetening similar in its operation to that last above referred to but differing in that the reagent, instead of being an aqueous solution of sodium hydroxid with lead monoxid (sodium plumbite?) is a powdered solid consisting substantially of calcium hydroxid with lead monoxid (calcium plumbite?). In both of these applications an inert porous material is added to serve as a supporting and absorbing medium for maintaining the incoherency of the powder, and in the second named a small proportion of sodium or other alkali metal hydroxid is also added, this functioning as an accelerator of the various reactions involved.

This powder, being maintained in suspension in sour oil to which a proper proportion of free sulfur has been added, produces substantially the same reactions as those last described. The lead reacts with the mercaptans to form lead mercaptids which are split by the free sulfur with the formation of alkyl disulfids and lead sulfid. The reactions, however, proceed farther than this as, in the presence of an excess of calcium hydroxid and under suitable conditions, calcium plumbite is rapidly regenerated and is thereupon available for the treatment of further quantities of sour oil. This cyclic reaction, which proceeds with great rapidity, may be maintained until the reagent becomes exhausted by reason of the substantially complete conversion of the calcium hydroxid constituent into calcium sulfid, or for other reasons (which will be set forth) other than the consumption or inactivity of the lead constituent. In this process the lead is repeatedly used and will convert into the disulfid form a quantity of mercaptan varying from three to twenty or more times that which will directly combine with the lead.

The above described methods of sweetening with aqueous solutions of sodium plumbite are not of my invention and the method of sweetening with solid calcium plumbite is not of my present invention, these methods being set forth in order to show the state of the art to the improvement of which my instant invention, hereinafter set forth, is directed.

The instant invention comprises two steps or phases, both directed to the common ends of completely exhausting the reagent and of retaining the lead or other heavy metal constituent in the system even after the remainder of the reagent reaches a condition in which it is no longer useful and must be withdrawn. The first step is applicable only to treatments in which a powdered solid reagent is used and is directed to maintaining the powder in such physical condition as to permit the ultimately active constituent (the calcium hydroxid in the case of the calcium plumbite reagent) to be completely consumed, thus prolonging the life of the reagent in the original cycle to the greatest possible extent. The second step applies not only to treatments with a solid reagent but also to treatments with aqueous sodium plumbite in the cases, above referred to, in which a slow regeneration of sodium plumbite is produced by interaction between lead sulfid and sodium hydroxid.

I have discovered, in treating a great number of sour oils with solid calcium plumbite, that the active life of the reagent is highly variable. In some cases the reagent becomes inactive after it has converted two or three times the mercaptan equivalent of the lead content while in other cases the conversion continues up to five, ten or even twenty times the calculated quantity.

Reasoning from the nature of the reactions and of the materials involved it appears probable that this variation is due to changes in the physical condition of the solid reagent. The action of the sour oil on the solid calcium plumbite is to extract the lead, producing a liquid lead mercaptid which is entrained, as a solution or as a colloidal suspension, in the oil body. The reaction between the lead mercaptid and the dissolved sulfur produces a flocculent precipitate of oil-insoluble lead sulfid. In order to produce a renewed supply of calcium plumbite these lead sulfid flakes must be brought into intimate contact with the solid grains of calcium hydroxid. This reaction probably produces calcium sulfid, also oil-insoluble, and if the reaction takes place on the surface of the grain it must leave the grain of hydroxid coated with a film of calcium sulfid which would tend to insulate the interior of the grain from further chemical combination.

These considerations indicated that the activity of the reagent might be prolonged by such mechanical treatment of the reagent as would tend to abrade and remove the films surrounding the grains of lime, and such proved to be the case. Providing the lime content of the reagent has not been substantially consumed, grinding or other forceful abrasion of the grains is found to result in an immediate renewal of the activity of the reagent. It will be understood that the original reagent contains a material excess of lime over the quantity required to combine with the lead to form calcium plumbite, that this excess of lime is gradually consumed by conversion into inactive calcium sulfid, and that when the free lime is reduced to a certain minimal quantity the reagent cannot be further reactivated in this manner.

Figure 1:
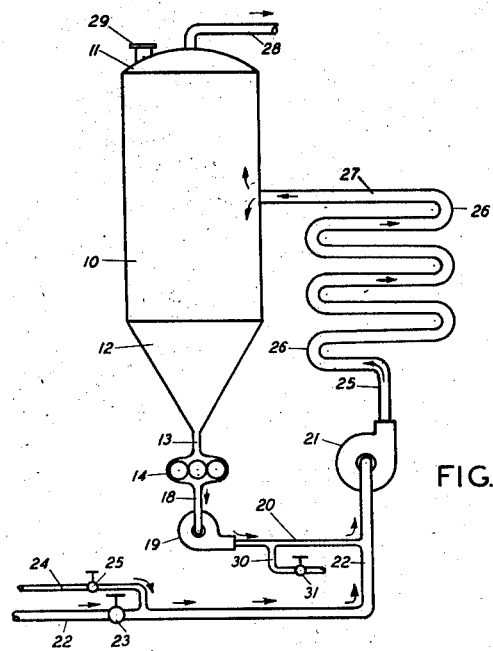

In order to put my discovery into practice I have devised the apparatus shown in the attached drawings, Fig. 1, which illustrates in a diagrammatic manner certain well known units assembled in such manner as to enable the practice of my invention.

Figure 3:
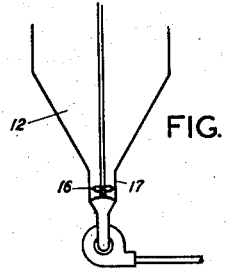
Figure 2:
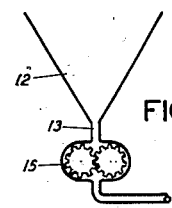
Figure 6:
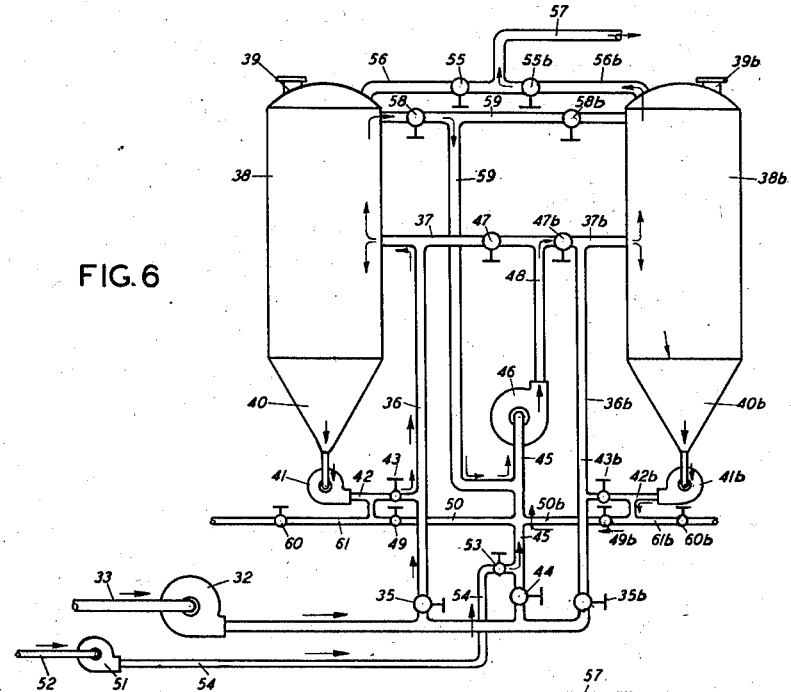
Figure 5:
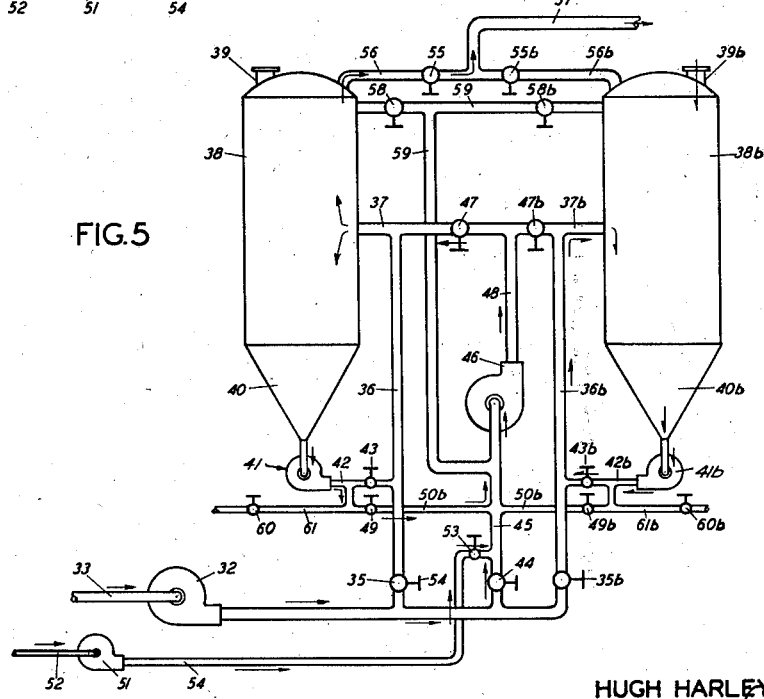
Figure 8:
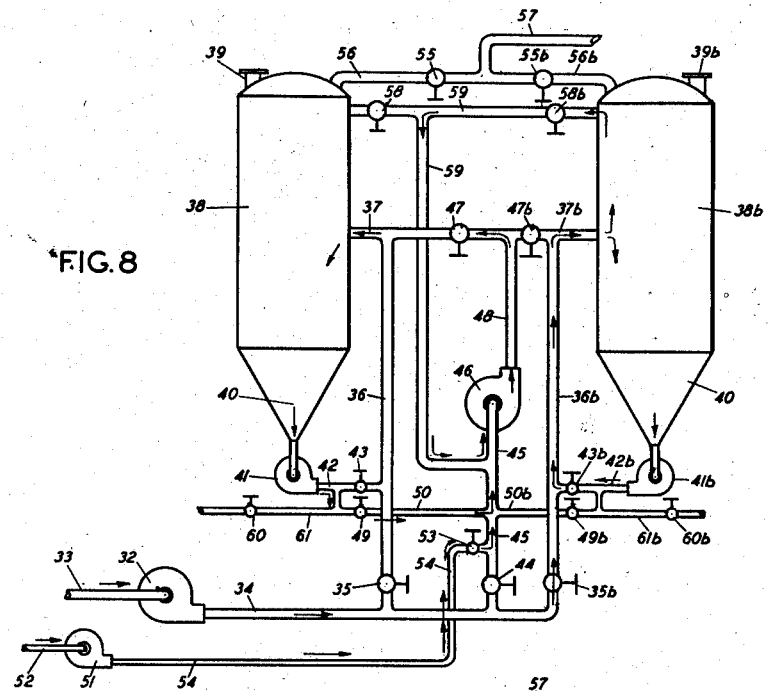

In the drawings 10 is an elongated vertical cylindrical settling shell having a closed top 11 and a steeply inclined conical bottom 12. This shell functions solely to allow the reagent to subside from the mixture and has no inside fittings. A pipe 13 conducts the reagent, as it settles, into a grinder 14 where it is thoroughly comminuted and pulped. The grinding rolls indicated may be replaced by any preferred form of grinding or agitating mechanism by which the reagent particles may be abraded against metallic surfaces. Thus as in Fig. 2 a meshed gear pump 15 may be used, or as in Fig. 3 a high speed beater or propeller 16 revolving in a pocket 17 at the point of the cone. In either case a pipe 18 conducts the ground or beaten slurry into the suction of a pump 19 having a discharge pipe 20. If the grinding mechanism used is itself a pump (as in the case of the gear pump, Fig. 2) the separate pump 19 may be omitted. Also the pump 19 may be an open runner centrifugal pump of the "sand pump" type which, particularly if operated with a throttled suction, will itself impart a high degree of abrasive action to the reagent grains.

A pump 21 is supplied with sour oil by means of a pipe 22 controlled by a valve 23 and communicating with a tank or other source of supply not shown. Between the valve and the pump a branch line 24 controlled by a valve 25 communicates with a tank or other source of supply of oil containing sulfur in solution. Through this pipe is admitted a stream of oil containing the proportion of sulfur required to precipitate the lead mercaptid. The pump 21 discharges through a pipe 25 into a contactor 26, which is merely an elongation of the discharge pipe designed to afford sufficient time of contact between reagent and raw oil for the sweetening reaction to be completed before the mixture enters the settling shell 10 through a pipe 27. If the discharge pipes themselves are of sufficient length this contactor may be omitted. A pipe 28 conducts sweetened oil to a tank or other point of storage not shown. A manhole 29 is provided for placing dry reagent in the settling shell and a branch pipe 30 controlled by a valve 31 provide for pumping or draining a slurry of exhausted reagent to a filter, settling tank or other preferred point of disposal.

The apparatus is most easily started by partly filling the settling shell 10 with clear oil, either sour or sweetened. A desired quantity of dry reagent powder is gradually admitted through manhole 29, preferably in a slow stream, the raw oil and sulfur oil valves 23 and 25 being closed and the grinder, the slurry pump 19 and the mixing pump 21 being now at full speed.

When the desired quantity of reagent has been admitted, this quantity being determined by considerations entirely outside the scope of this invention, the manhole 29 is closed, the valves 23 and 25 opened and suitably regulated, and pump 19 and/or the grinder so regulated as to discharge and to thoroughly comminute and pulp the reagent which is continuously settling from the body of oil in the settling shell. This reagent in passing through pipe 20 into oil pipe 22 is thoroughly intermingled with sour oil and sulfur oil in pump 21 and the reactions between the sour oil and the lead and between the lead mercaptid and the sulfur are completed before the oil enters the settling shell. This shell therefore never contains anything except sweetened oil and partly spent reagent, the latter subsiding into the cone and passing thence into the grinder while the sweetened oil makes its way to the receiving tank.

If this oil contains traces of lead sulfid, as is often the case, it may desirably be first passed through some form of filter from which the collected solids may occasionally be washed back to the settling shell.

The above procedure provides for the retention of all the lead in the reagent and for the exhaustion of the reagent up to the point where the lime is substantially consumed, but it does not prevent the loss (or the necessity for an expensive secondary recovery) of the lead contained in the exhausted reagent. This lead may be extracted from the exhausted reagent and made available for continued use, at no operating cost whatever, by utilizing the principle embodied in the apparatus shown in Figs. 4 to 8 inclusive, these figures showing the same apparatus with directional arrows indicating movement of liquids at various stages in the complete operation.

It should be premised that when we speak of an "exhausted" reagent we do not refer to one which has become completely inactive, but rather to a reagent which has slowed down to the point where it is no longer commercially feasible to keep it in use. At this stage the reagent is still capable of reacting with a quantity of mercaptan equivalent to the amount of lead which it maintains, but at too slow a rate to make its further use desirable. If, at this stage, we place a system containing fresh reagent in series with the system containing the exhausted reagent, continue to feed sour oil without sulfur into the exhausted system and carry this oil forward while injecting the required proportion of sulfur oil into the fresh system, we gradually dissolve the lead from the exhausted reagent, converting it into lead mercaptid which passes forward with the oil and is precipitated by the sulfur oil in the fresh system.

This process may best be described in connection with a description of the drawings Fig. 4 which consists of two units each generally similar to the apparatus shown in Fig. 1.

In starting the apparatus a pump 32, which communicates through a pipe 33 with a source of supply of sour oil, discharges through a pipe 34, an open valve 35, (all valves are closed except as otherwise stated) and pipes 36 and 37 into a settling shell 38, until this shell is perhaps one-half filled. Valve 35 is then closed. Manhole 39 is now opened and a stream of fresh reagent, powdered or liquid as the case may be, is admitted. This reagent subsides through the oil layer into the cone 40 and is drawn, together with a portion of the oil, into the beating pump 41 from which the mixture is discharged as a smooth and finely divided slurry through a pipe 42 and an open valve 43 into pipe 36 and thence through pipe 37 back to the settling shell. The direction of flow of liquids through the operating parts of the apparatus when these settings are completed is shown by the arrows in Fig. 4.

When a sufficient proportion of reagent has been thus placed in the shell the manhole 39 is closed, valve 35 is closed, sour oil valve 44 in pipe 45 is opened, circulating pump 46 is started, valve 47 is opened and raw oil is thus discharged through pipes 48 and 37 into settling shell 38. At the same time valve 43 is closed and valve 49 in pipe 50 is opened, thus directing the reagent slurry into the suction of pump 46, in which it is thoroughly dispersed in the oil stream. At the same time sulfur oil pump 51, having a suction pipe 52 communicating with a source of supply of sulfur solution, not shown, is started and a valve 53 in discharge pipe 54, which communicates with oil pipe 45 above the valve 44, is opened and regulated to admit the requisite proportion of sulfur into pump 46, where it is thoroughly intermixed with the sour oil and the suspended reagent. At the same time valve 55 in overflow pipe 56 is opened and as soon as the shell 38 is filled, sweetened oil flows away from the apparatus through pipe 57 at the same speed as that at which raw oil plus sulfur oil are admitted. At this stage in the operation the direction of flow is indicated by the double barbed arrows on the left side of Fig. 5.

Feeding of raw and sulfur oil, circulation and grinding or beating of reagent and overflow of sweetened oil are continued until the reagent is so far exhausted that the rate at which oil can be sweetened falls too low to be economical. During this time the opposite settling shell 38b may be charged and made ready for operation by admitting oil through valve 35b and reagent through manhole 39b and operating the beating pump 41b, all as previously described. These latter operations are indicated by single barbed arrows on the right side of Fig. 5.

The nominally exhausted reagent in shell 38 now contains all the lead originally present, but in a slowly reactive condition. This lead is transferred to shell 38b in the following manner.

Open valve 35 and close valve 44, thus directing the stream of raw oil into shell 38. Open valve 58 in cross over line 59 and close valve 55, thus directing the overflow from shell 38 into the suction of pump 46. Open valve 47b to direct the discharge of pump 46 into shell 38b and open valve 55b to direct overflow from this shell into the sweetened oil line 57.

Operate beater pump 41 with valve 49 closed and valve 43 open, thus circulating the exhausted reagent through the stream of entering oil. Operate beater pump 41b with valve 43b closed and valve 49b open, thus circulating the fresh reagent through pump 46 and through the stream of oil entering that pump from shell 38. Continue the admission of sulfur oil through line 54 and valve 53. These operations are indicated by the directional arrows in Fig. 6.

The spent reagent in shell 38 being repeatedly contacted with raw oil will gradually give up its lead, which will pass as lead mercaptid into pump 46, where it meets sulfur oil and is precipitated and carried into shell 38b along with the reagent which is circulating through that shell and through pump 46. No change need be made in the rate of feed of sulfur oil as this rate is determined, not by the quantity of lead in the system, but by the proportion of mercaptan in the entering raw oil.

When the lead is removed from the spent reagent, as may be determined by testing a sample of the effluent oil with sulfur oil, the residue of the reagent may be withdrawn from shell 38 and discarded or otherwise treated. For this purpose valve 43 is closed and valve 60 in pipe 61 is opened, thus directing the slurry of oil and reagent into a settling tank, filter or other preferred means for regaining the small amount of entrained oil. Shell 38 is now free from reagent and is filled with raw oil.

A portion of this oil may now be withdrawn by opening valve 44 and closing valve 35, thus directing the stream of raw oil into the suction of pump 46, and opening valve 49 to direct the discharge of pump 41 into pipe 45. This operation is indicated by the single barbed arrows on the left side of Fig. 7. The liquid level being sufficiently lowered, valve 43 is opened and valve 49 closed, manhole 39 is opened and a charge of fresh reagent introduced and circulated through shell 38 as in the first instance. However, as all the lead previously introduced is still in the system, the fresh reagent may be free from lead or may contain only such small quantity as will make up for mechanical losses and the slight amount of lead retained in the discarded reagent.

Figure 7:
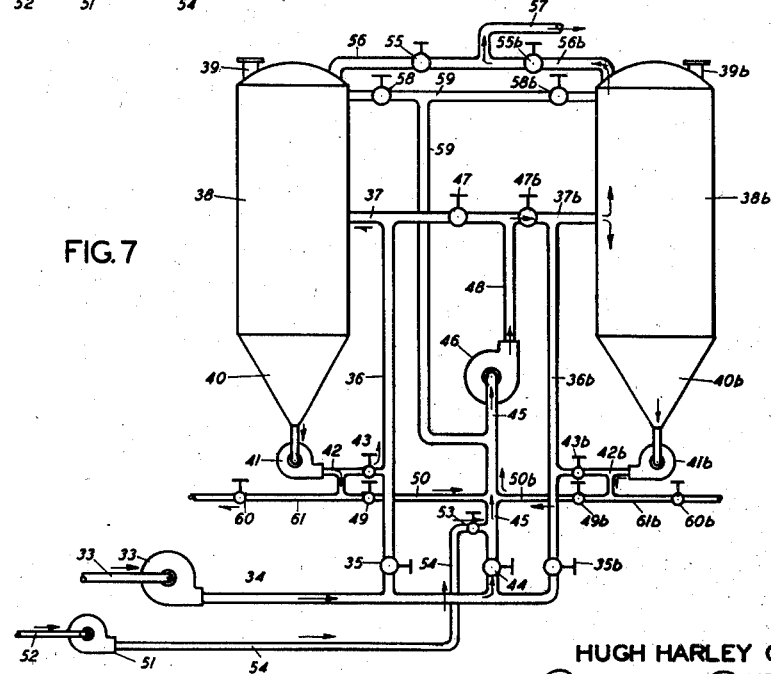

The reagent having been introduced and the manhole closed, shell 38 stands idle (continuing a slow circulation of reagent to prevent it from packing in the cone) until the reagent in shell 38b is exhausted by continued operation of the right side of the apparatus, as shown by the double barbed arrows on Fig. 7.

The apparatus is then reversed in direction by closing valve 44 and opening valve 35b, closing valve 49b and opening valve 43b, closing valve 55b and opening valve 58b, opening valve 47 and closing valve 47b, opening valve 49 and closing valve 43, and opening valve 47. With the valves in this position the exhausted reagent in shell 38b is being deprived of its lead and the oil is being sweetened in shell 38. The apparatus is then functioning in the manner indicated by the directional arrows on Fig. 8.

Further operations are a mere repetition of the previous steps, and the apparatus may be kept in strictly continuous operation by merely reversing the direction of flow from shell to shell and replacing spent reagent on each such reversal.

I claim as my invention:

1. A method of sweetening sour petroleum oils which comprises: maintaining a flow stream of sour oil; maintaining a body of sweetened oil in intermixture with a powdered solid sweetening reagent comprising calcium hydroxide and lead monoxide; withdrawing a slurry of said reagent and said sweetened oil from the lower portion of said body; mechanically abrading the surfaces of the solid particles of said slurry; introducing said slurry into said flow stream; introducing a predetermined proportion of free sulfur into said flow stream; discharging said mixed stream into said body, and withdrawing sweetened oil from the upper portion of said body.

2. A method of sweetening sour petroleum oils which comprises: maintaining a flow stream of sour oil; maintaining a body of sweetened oil in intermixture with a powdered solid sweetening reagent comprising calcium hydroxide and lead monoxide; withdrawing a slurry of said reagent and said sweetened oil from the lower portion of said body; grinding said slurry to abrade the surfaces of its solid particles; introducing said slurry into said flow stream; introducing a predetermined proportion of free sulfur into said flow stream; discharging said mixed stream into said body, and withdrawing sweetened oil from the upper portion of said body.

3. A method of sweetening sour petroleum oils which comprises: maintaining a flow stream of sour oil; maintaining a body of sweetened oil in intermixture with a powdered solid sweetening reagent comprising calcium hydroxide and lead monoxide; withdrawing a slurry of said reagent and said sweetened oil from the lower portion of said body; mechanically abrading the surfaces of the solid particles of said slurry; introducing said slurry into said flow stream; introducing a predetermined proportion of free sulfur into said flow stream; maintaining said mixed stream in motion for a time sufficient to effect sweetening of said sour oil; discharging said mixed stream into said body, and withdrawing sweetened oil from the upper portion of said body.

4. A method of sweetening sour petroleum oils which comprises: maintaining a flow stream of sour oil; maintaining a body of sweetened oil in intermixture with a powdered solid sweetening reagent comprising calcium hydroxide and lead monoxide; withdrawing a slurry of said reagent and said sweetened oil from the lower portion of said body; grinding said slurry to abrade the surfaces of its solid particles; introducing said slurry into said flow stream; introducing a predetermined proportion of free sulfur into said flow stream; maintaining said mixed stream in motion for a time sufficient to effect sweetening of said sour oil; discharging said mixed stream into said body, and withdrawing sweetened oil from the upper portion of said body.

5. In the process of sweetening sour petroleum oils with a powdered solid sweetening agent comprising calcium hydroxide and lead monoxide, the steps which include: mechanically abrading the surfaces of the particles of said reagent, after contact of said reagent with sour oil, for removing films of reaction product from said surfaces, and recycling the abraded particles into contact with further quantities of sour oil.

6. In the process of sweetening sour petroleum oils with a powdered solid sweetening agent comprising calcium hydroxide and lead monoxide, the steps which include: grinding a slurry of said reagent and intermixed oil, after contact of said reagent with sour oil, for removing films of reaction product from the surfaces of the particles comprising said reagent, and recycling the ground slurry into contact with further quantities of sour oil.

HUGH HARLEY CANNON.